Jan. 6, 1970   D. D. LENHART ET AL   3,487,520
PROCESS FOR PRODUCING HEAT TRANSFER PANELS
Filed Oct. 19, 1966   2 Sheets-Sheet 1

Donald D. Lenhart,
Fredric J. Bliss,
INVENTORS.

BY.

ATTORNEY.

Jan. 6, 1970  D. D. LENHART ET AL  3,487,520
PROCESS FOR PRODUCING HEAT TRANSFER PANELS
Filed Oct. 19, 1966  2 Sheets-Sheet 2

(b) 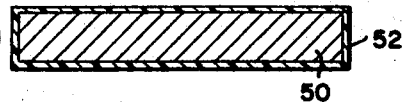
(c) 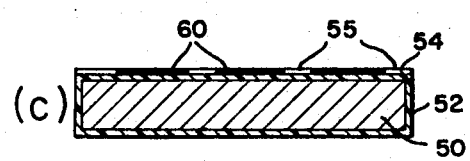
(d) 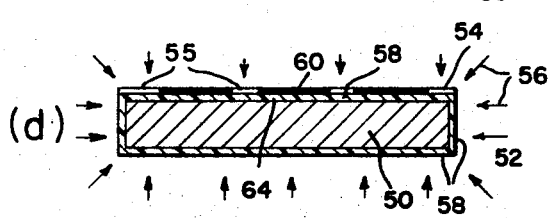
(e) 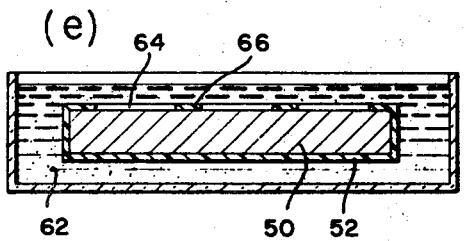  (f) 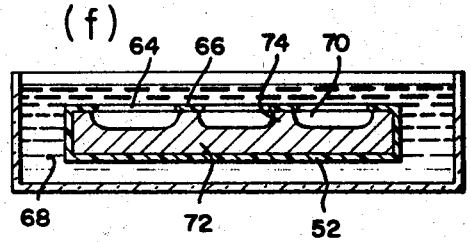
(g) 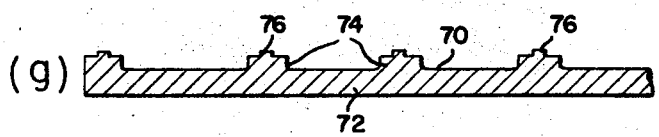
(h) 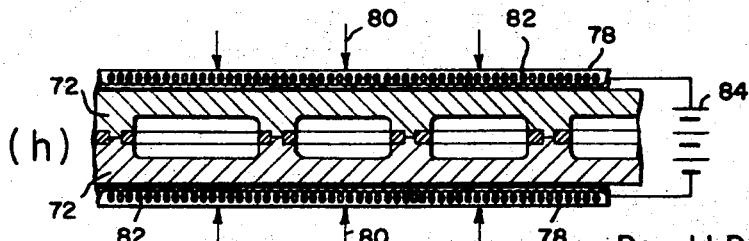
Donald D. Lenhart,
Fredric J. Bliss,
INVENTORS.
BY.
ATTORNEY.

United States Patent Office 3,487,520
Patented Jan. 6, 1970

3,487,520
PROCESS FOR PRODUCING HEAT
TRANSFER PANELS
Donald D. Lenhart, Northridge, and Fredric J. Bliss, Hermosa Beach, Calif., assignors to Hughes Aircraft Company, Culver City, Calif., a corporation of Delaware
Filed Oct. 19, 1966, Ser. No. 587,863
Int. Cl. B21d 26/08
U.S. Cl. 29—157.3                3 Claims

ABSTRACT OF THE DISCLOSURE

A heat transfer panel is fabricated from a pair of plates to provide an internal flow path. One plate is the mirror image of the other plate and each mirror image comprises one-half the desired flow path so that, when the plates are secured together, a complete flow path is produced. Such half paths are formed by a chemical etching process and are bounded by lands. Bosses are also chemically etched on the lands of one or both plates to form a separation between the plates so that solder can be deposited on the lands and in the separations. The plates are then placed between heated platens under pressure to permit the solder to join the plates at the lands. The bossess prevent the solder from being squeezed out from between the separation.

---

The present invention relates to a process for producing heat transfer panels.

Heat transfer panels are used for heating or cooling purposes by transferring heat to or from devices to be heated or cooled by the panels and, consequently, they may be defined to include such heat exchange equipment as evaporators, condensers, radiators and cold walls for electronics equipment. To effect efficient heat transfer, fluid may be circulated through and exhausted from passages in the panels, and depending upon heat transfer requirements, the panels may contact the devices or may be separated therefrom by gas or other medium.

Such heat transfer panels may be produced by many well-known methods including dip brazing and roll forming. In the dip brazing process, a pair of metal cover sheets having a brazing alloy deposited thereon are placed about a fluted core of expanded sheet metal or, alternatively, separate sheets of brazing alloy are placed between the core and cover sheets. The entire assembly of core, cover sheets and brazing alloy are immersed in a bath of molten flux to secure the assembly together. Since this process causes salts to be deposited inside the panel, the salts must be removed to prevent corrosion of the panel; however, such removal of salts is difficult and costly. In addition, the brazing occurs at a temperature which is close to the melting range of the material of the transfer panel and the heat will remove any temper from, and consequently will soften, the panel. The panel must then be retempered by heat treatment which may cause an undesired panel warping.

Roll formed panels may be fabricated by silk screening a release agent in the desired fluid passage pattern between two sheets of metal and by rolling the two sheets together under high pressure. The mechanically bonded sheets are then placed between platens having a predetermined clearance. Pressure is applied between the sheets in the areas where the release agent has been silk screened for expansion of the sheets at the areas to the limits of the clearance. Since the rolling operation distorts the fluid passage and the expanding operation creates stresses in the panel, the finished panel is warped so that close manufacturing tolerances are not readily obtainable, resulting in the inability to precisely fit the panels into places with small clearances. In addition, this method produces a panel having a corrugated exterior which reduces the surface area available for conductive heat transfer between the panel and any equipment to be heated or cooled thereby.

The present invention is directed to a novel process for the fabrication of a heat transfer panel having an internal coolant flow path, which process avoids the problems present in prior processes. A panel produced by the present invention is formed from a pair of plates which are secured together preferably by soldering. One plate is the mirror image of the other plate and each mirror image comprises one-half the desired flow path or passage so that, when the plates are secured together, a complete flow path is produced. The invention forms such half paths by a chemical etching process or a machining operation. The inventive process also provides for the formation of any exterior configuration of the panel which, for most cases, is preferably flat so that a maximum surface area for conductive heat transfer may be obtained. However, if it is desired to space the panel from the equipment to be cooled, for example, an external flow path for air, as by means of fins, may be machined or chemically etched into the plates or completed panel to provide an efficient external cooling surface.

It is, therefore, an object of the invention to provide a simple method for fabricating heat transfer panels.

Another object of the invention is the provision of a method for fabricating accurately dimensioned heat transfer panels.

Another object is to provide heat transfer panels which retain their temper.

Another object is the provision of strong leak-proof panels.

Another object is the provision of simply fabricated heat transfer panels by means of simple tooling.

Other aims and objects as will as a more complete understanding of the present invention will appear from the following explanation of an exemplary embodiment and the accompanying drawings thereof, in which.

FIGS. 3(a)–(h) depict the process of forming a heat transfer panel.

Figure 1:
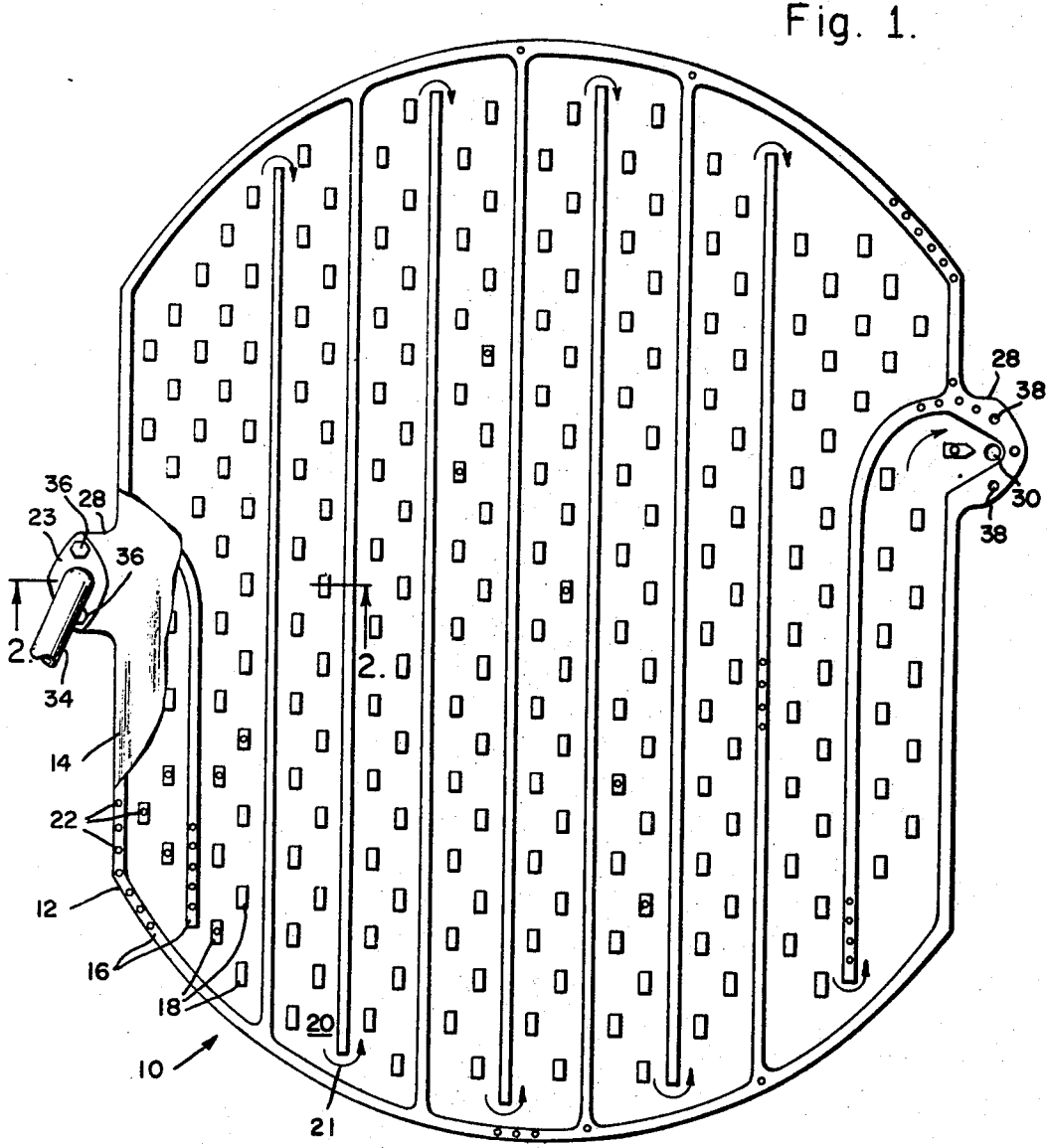
FIG. 1 is a view of a heat transfer panel with one of its plates partially cut away.
Figure 2:
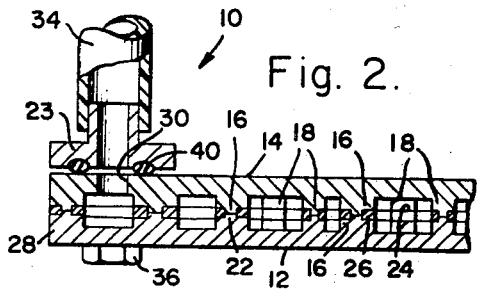
FIG. 2 is a partial section of the panel taken along lines 2—2 of FIG. 1.

A heat transfer panel 10, as depicted in FIGS. 1 and 2, comprises a pair of plates 12 and 14, each of which is provided with a series of cooperating lands 16 and 18. Lands 16 are elongated and alternately extend from one end of the panel toward the other end to form a sinuous fluid passage 20 as depicted by arrows 21. As best illustrated in FIG. 2, the lands are provided with bosses 22 which space the plates by a separation 24. Solder 26 is deposited within the separations to secure the plates together.

Extensions 28 are provided on opposed sides of the panel and ports 30 are bored through one of the plates in each extension. Flanges 23 and conduits 34 are secured to the extensions by bolts 36 which extend through holes 38 in the extensions. An O-ring 40 is positioned between each flange and the extension to provide a fluid seal. Consequently, fluid will flow from conduit 34, ports 30 and passage 20 about lands 18.

Although each plate 12 and 14 is illustrated as having one-half of passage 20, lands 16 and 18, and bosses 22, it is to be understood that these elements may be provided in only one plate and that the other plate may be flat to close the passage. The plates are secured together by solder in a manner similar to that described above.

In the preferred embodiment shown in FIGS. 3(a)–(h), a chemical etching process is used to form the two panel plates, each of which is provided with one-half of the desired flow path. The preparation of each plate may be subdivided into three broad steps comprising the preparation of a mask depicting the flow path design, the chemical etching of each plate according to the designed flow path and the securing of the two plates together to form the panel.

In the following description of the preferred process, the flow path for heating agent or coolant is defined as being divided into halves with one-half being etched into one panel plate and the other half being etched into the other panel plate. In order to provide half paths which will be matched and aligned to form a complete flow path when the plates are assembled into the finished panel, one plate is described to be the mirror image of the other plate.

The mask may be prepared according to several methods including a silk screen process and a stencil and etch resistant paint process. The particular method used depends upon the number of panels to be made and the respective economics involved therein. According to the preferred method of making the mask, a drawing or picture of each panel plate with its half fluid passage is prepared. Tape or ink may be placed on the drawing on those areas which correspond to lands 16 and 18 (see FIGS. 1 and 2). The lands on one plate are drawn in order to match with similar lands on another plate, thus one plate is the mirror image of the other plate. The art work formed by the taped or inked drawing is then photographed to form a transparency and the photographic transparency becomes the mask for the subsequent etching process.

In the case where the lands on the art work are taped, the mask is a negative photographic transparency of the art work. When the areas between the lands are taped or inked, the mask used is a positive photographic transparency. In either case, the mask depicts the lands as clear portions on the transparency and the areas between the lands as shaded or opaque portions.

Each plate is then prepared for etching by completely coating it with a light sensitive emulsion, which is a photographic sensitive light material of the type which polymerizes upon exposure to ultra-violet light. The emulsion coat is dried and hardened. The prepared mask is then superimposed on the emulsion coated blank and the two as superimposed are exposed to an ultra-violet light source which causes a cross-polymerization of those portions of the emulsion which are not shielded by the opaque portions of the mask from the ultra-violet light rays. The emulsion is exposed to the light until all unshielded portions of the plate are completely polymerized and exposure time is dependent, in part, upon the intensity of light, the emulsion material, and the equipment used. The mask is then removed and the emulsion coated plate is placed in a developer which removes all the unpolymerized emulsion material. The polymerized emulsion coating, however, is not affected by the developer and, therefore, the plate, as coated, will be provided with the same design as that of the art work described above. The time in which the coated mask is left in the developer is determined by a visual inspection of the degree of removal of undeveloped emulsion from the plate.

After the developing step has been performed, the coated plate is placed within a solution of etchant which is of the type that will attack the plate material but will not affect the developed emulsion coat. The etchant is allowed to attack the material until the desired amount of plate material has been removed. The time in which the etching takes place depends upon the amount of etchant used, the strength of the etchant, the type of material to be etched, and the amount of material to be removed. The amount of etching may be observed by removal of the plate from the solution from time to time. The etched plate is then removed from the solution and thoroughly rinsed. The remaining emulsion coat is removed by an organic solvent.

Because the etching process may remove blank material underlapping the emulsion coat, the art work may be made larger than the finished product so that the developed emulsion coat will border areas which are smaller than the final etched areas in order to take the underlapping etching into consideration.

Small bosses may be formed on one or both plates by repeating the above steps, i.e., by preparing art work and a mask of the desired bosses, by coating the entire previously etched plate with a photographic polymerizable substance, by exposing the substance or emulsion to ultra-violet light, by removing unpolymerized portions with a developer and by etching the exposed parts of the plate.

Solder is then placed on the lands of both plates by means of the well-known electro-plating process. In some cases, it may be necessary first to electro-plate small amounts of copper and nickel to the lands to insure a good bond between the solder and the plate material.

The mating plates with the electro-plated solder thereon are placed together under pressure between heated platens. The solder melts and flows to join the plates and the temperature is then lowered to permit freezing of the solder. The bosses maintain a separation between the two plates to insure that the proper amount of solder is present to bond the plates together.

Holes are then drilled in panel extensions 28 to form a fluid entrance and exit 30 and to form a flange attaching means.

EXAMPLE

A panel, comprising a pair of plates, is fabricated from a pair of blanks which are chemically etched to form mirror image designs of a fluid passage and which are further machined to provide fluid ports and conduit attachment means. For convenience of description, the process is subdivided into three broad process steps comprising the preparation of a mask, the chemical etching and the final assembly of the panel. Although particular materials and process parameters are described below, it is to be understood that such materials are set forth solely for illustrative purposes.

PREPARATION OF A MASK

A drawing of each plate with one-half of the desired fluid path is prepared. The lands of the drawing are drawn slightly larger than the desired lands of the finished panel in order to allow for undercutting by the etchant. Black tape or ink is placed on the areas of the drawing which correspond to the areas of a blank to be chemically etched. These areas to be etched become fluid passages in the finished product.

A photographic transparency is taken of the drawing or art work and the positive of the photographic transparency becomes the mask for the subsequent etching process since the taped parts become dark portions on the transparency. Such a positive photographic transparency 54 is depicted in FIGS. 3(c) and 3(d).

THE CHEMICAL ETCHING PROCESS

Figure 3:

An aluminum blank 50 [see FIG. 3(a)], which is to become a plate of one-half a heating panel, is completely coated with a photographic sensitive light material 52 [FIG. 3(b)], generically known as a "light sensitive emulsion" or a "photo polymerizable substance." Several emulsions may be used, as for example, a cinnamic acid ester polymeric material described in Patent Nos. 2,670,285; 2,670,286; 2,670,287, by L. M. Minsk et al., assigned to Eastman-Kodak Company. The emulsion is dried.

The mask 54, comprising shaded or dark portions 60 and transparent portions 55, [FIG. 3(c)] is placed over one side of the emulsion coated blank and the whole is exposed to an ultra-violet light source 56 [FIG. 3(d)]. The light causes a cross-polymerization of that portion 58 of the sensitive emulsion which is not shielded out by the dark portions 60 of the mask. Depending upon the light equipment, the emulsion, the intensity of the light, etc., the exposure time varies; however, exposure to light continues until all portions of the emulsion not covered by the dark portions are completely polymerized.

The mask is then removed and the emulsion coated plate is placed in a developer 62 [FIG. 3(e)] which removes all the unpolymerized emulsion 64 but which does not affect the polymerized emulsion 66. The time in which the coated plate is left in the developer is determined by a visual inspection of the plate through noting the removal of the unpolymerized emulsion portions. A typical developer is trichlorethylene, which acts upon the abovementioned patented emulsion. The remaining emulsion portion acts as a protective covering for the aluminum blank.

An etching solution or etchant 68 is then applied [see FIG. 3(f)]. For an aluminum plate, ferric chloride or an alkaline type etchant is used. The amount of etchant used also depends upon the time the etching process is to take, the type of material to be etched, the strength of the etchant, and the amount of material to be removed. The amount of etching may be observed by removal of the plate from the solution. A half fluid passage 70 is thus formed in plate 72 (indicia 72 being used to distinguish the plate from blank 50), passage 70 being bordered by lands 74.

At the end of the etching process, the plate is removed from the solution and thoroughly rinsed. The protective covering material is removed by a chlorinated aliphatic solvent such as methylene chloride or ethylene dichloride.

A second plate having a mirror image of the design etched in the plate described above is prepared according to the steps described above.

Bosses 76 [see FIG. 3(g)] are formed on the lands by chemically etching material from the plates according to the process described above, the only difference residing in the use of a photographic mask depicting the bosses instead of the fluid passage wherein the clear portions on the mask represent bosses.

FORMATION OF THE PANEL FROM A PAIR OF PLATES

The panels are formed by soldering a pair of plates 72 together. Nickel and copper are first electroplated onto the lands of the respective plates to insure a good solder bond. Solder, comprising a 60–40 ratio of tin and lead or a 95–5 ratio of tin and silver is then electroplated onto the nickel-copper base. Flux is then applied to the solder.

The mating plates with the electroplated solder thereon are placed together for ten seconds between platens 78 [see FIG. 3(h)] at 450° F. under pressure of 20 to 50 pounds per square inch, the pressure being represented by arrows 80. Precise control of temperature and pressure, however, is not required. Heat may be supplied through coils 82 from a power source 84. The solder melts to join the plates and the platens are cooled.

The formed panel is then removed from the platens and holes 30 and 38 (see FIG. 1) are drilled into the extensions for fluid ports and attachment of flanges.

The pressure of the platens, in part, minimizes the possibility of panel warpage since there is little or no localization of stresses due to uniform heating and cooling of the entire panel.

Although the invention has been described with reference to a particular embodiment thereof it should be realized that various changes and modifications may be made without departing from the spirit and scope of the invention.

What is claimed is:

1. A method of fabricating a heat transfer panel having an enclosed internal fluid passage and comprising a pair of plates having aligned land portions comprising the steps of utilizing a pair of blanks to be formed into the plates, removing material from selected portions of at least one of the blanks while protecting other portions thereof by use of a chemical etching process to form an open fluid passage and to provide raised land portions alignable with the land portions on the other of the blanks, forming small bosses on the land portions of at least one of the blanks by removing selected material therefrom by use of a chemical etching process, depositing a bonding agent on at least one of the land portion, and securing and sealing the formed plates together at the land portions by use of the bonding agent while maintaining a separation between the plates by abutment of the bosses against the adjacent plate to enclose the open fluid passage.

2. A method as in claim 1 wherein said two steps of removing material comprise the steps of coating at least one of the blanks with a light sensitive emulsion, exposing specified areas of the emulsion to light rays by means of a mask superimposed over the emulsion coated blank to produce polymerized and unpolymerized areas of the emulsion, and removing the unpolymerized areas.

3. A method as in claim 1 wherein the bonding agent comprises solder and wherein the step of securing and sealing the plates together includes the step of applying heat and pressure to the assembled plates to cause the solder to flow and join the plates at the land portions.

References Cited

UNITED STATES PATENTS

| 2,587,116 | 2/1952 | Clay. | |
| 2,739,047 | 3/1956 | Sanz. | |
| 2,871,887 | 2/1959 | Obrebski et al. | |
| 2,615,236 | 10/1952 | Stulen et al. | 29—481 X |
| 3,419,954 | 1/1969 | Brownlee | 29—482 |

JOHN F. CAMPBELL, Primary Examiner

D. C. REILEY, Assistant Examiner

U.S. Cl. X.R.
29—482; 113—118